United States Patent

[11] 3,600,935

[72] Inventor Gilbert Baum
152 Brite Ave., Scarsdale, N.Y. 10583
[21] Appl. No. 753,111
[22] Filed Aug. 16, 1968
[45] Patented Aug. 24, 1971

[54] METHODS AND APPARATUS FOR PRODUCING A HOLOGRAPHIC LIGHT PATTERN FROM AN ULTRASONIC IMPULSE
33 Claims, 6 Drawing Figs.

[52] U.S. Cl. ................................................. 73/67.5 H,
340/5 H, 350/3.5, 340/3
[51] Int. Cl. .......................................................... G01n 29/04
[50] Field of Search ................................................. 73/67.5 H,
73.3; 350/3.5; 340/5 H

[56] References Cited
UNITED STATES PATENTS
3,434,339 3/1969 Stetson et al. ............... 73/67.6
3,444,316 5/1969 Gerritsen ................... 73/67.5 UX (H)
FOREIGN PATENTS
1,479,712 3/1967 Great Britain ............... 73/67.5 UX (H)

OTHER REFERENCES
Text Book, Optical and Electro-Optical Information Processing, by Tippett et al., pp. 156, pub. by the M.I.T. Press Nov. 1965
Neuman et al., Improvement of Recorded Holographic Fringes by Feedback Control, Applied Optics, June 1967, pp. 1097–1104.
Caulfield et al., Light Pipe Holography Applied Optics, July 1967, p. 1272.
4. Einhorn, The Sound of Holography is Ultra, Electronic Design, Sept. 13, 1967, pp. 17, 18 & 21.
5. Preston et al., Ultrasonic Imaging Using a Synthetic Holographic Technique, Applied Physics Letters, March 1967, pp. 150–152.

Primary Examiner—Richard C. Queisser
Assistant Examiner—John P. Beauchamp
Attorney—Curtis Ailes ABSTRACT: A method and apparatus employing an ultrasonic signal to cause an interference pattern between a coherent light reference beam and a second coherent light beam which is ultrasonographically modulated to form recordable interference patterns in the form of a hologram.

METHODS AND APPARATUS FOR PRODUCING A HOLOGRAPHIC LIGHT PATTERN FROM AN ULTRASONIC IMPULSE

The present invention relates to methods and apparatus to modulate light energy by acoustic energy and record the modulated light beam in the form of a hologram.

The use of ultrasonography, especially as a diagnostic tool in medical research has begun to achieve more and more importance in recent years.

One phase of ultrasonographic development has been in development of examination techniques. Another area has been the establishment of diagnostic criteria.

Both such phases have been dependent upon the methods of ultrasound generation and display of data for proper interpretation.

Two types of ultrasonographic examination are employed today. The first consists of a nonscanning pulse-echo technique. By this technique a single line of acoustic information is obtained through a three-dimensional object. This acoustic information is displayed in the form of a graph in which the distance along the baseline represents tissue depth or distance, and the deflection from the baseline represents the amplitude of the returning echo.

A second technique employs a complex electromechanical scanning system and yields an ultrasonographic tomograph through a plane of the examined three-dimensional object. Both systems use cathode ray tubes to display this information.

Pictures by either of such methods must be constructed often by photographs of successive scans at different levels to construct or interpret a picture from the tissue echoes.

Present techniques require further improvement even as to definition and interpretation. The equipment to achieve such result is bulky, very complicated, expensive and difficult to both operate, maintain and in addition gives limited definition.

The present invention provides a method and apparatus for the modulation of light energy by use of acoustic energy and enables an output of a three-dimensional hologram. There is now no longer restriction to a view of only a small section physically examined by electromechanical scan of an object by a small acoustic beam.

The importance of the use of ultrasound is in its ability to nondestructively penetrate tissue where an X-ray would either be dangerous or ineffective.

The X-ray has had the advantage of being able to take a single picture of a selected area and has not been limited to a picture of only a thin sweep sector but has been as a photograph through the object.

Holography has been known for some time but it has been only more recently that holograms have been able to be made and viewed accurately as a reproduction of the subject.

The hologram of today has primarily been brought about by the new ability to maintain coherent and accurate light frequencies and to modulate them.

Thus a film may be exposed without a lens and record the resultant interference pattern from a light source or laser beam of substantially uniform frequency which is split into a reference beam directed from the light source and a reflected or refracted beam, reflected from or refracted through an object.

When such a pattern has been developed on a film, for example, proper exposure of the film to a similar monochromatic light source will reveal the interference patterns of the hologram as the object appearing three-dimensionally in space.

In some instances, the three-dimensional pattern may be made visible under white light where a depth of the holographic plate is adapted to screen nonessential light frequencies and respond to the interference pattern to make the hologram visible.

According to the present invention, a light reference beam and a second light beam that has been ultrasonographically modulated forms recordable interference patterns in the form of a hologram.

Although such novel feature or features believed to be characteristic of the invention are pointed out in the claims, the invention and the manner in which it may be carried out may be further understood by reference to the description following and the accompanying drawings.

FIG. 6 is a diagrammatic detailed view of an alternate form of interference pattern recordation.

Referring now to the figures in greater detail, where like reference numbers denote like parts in the various figures.

Figure 1:
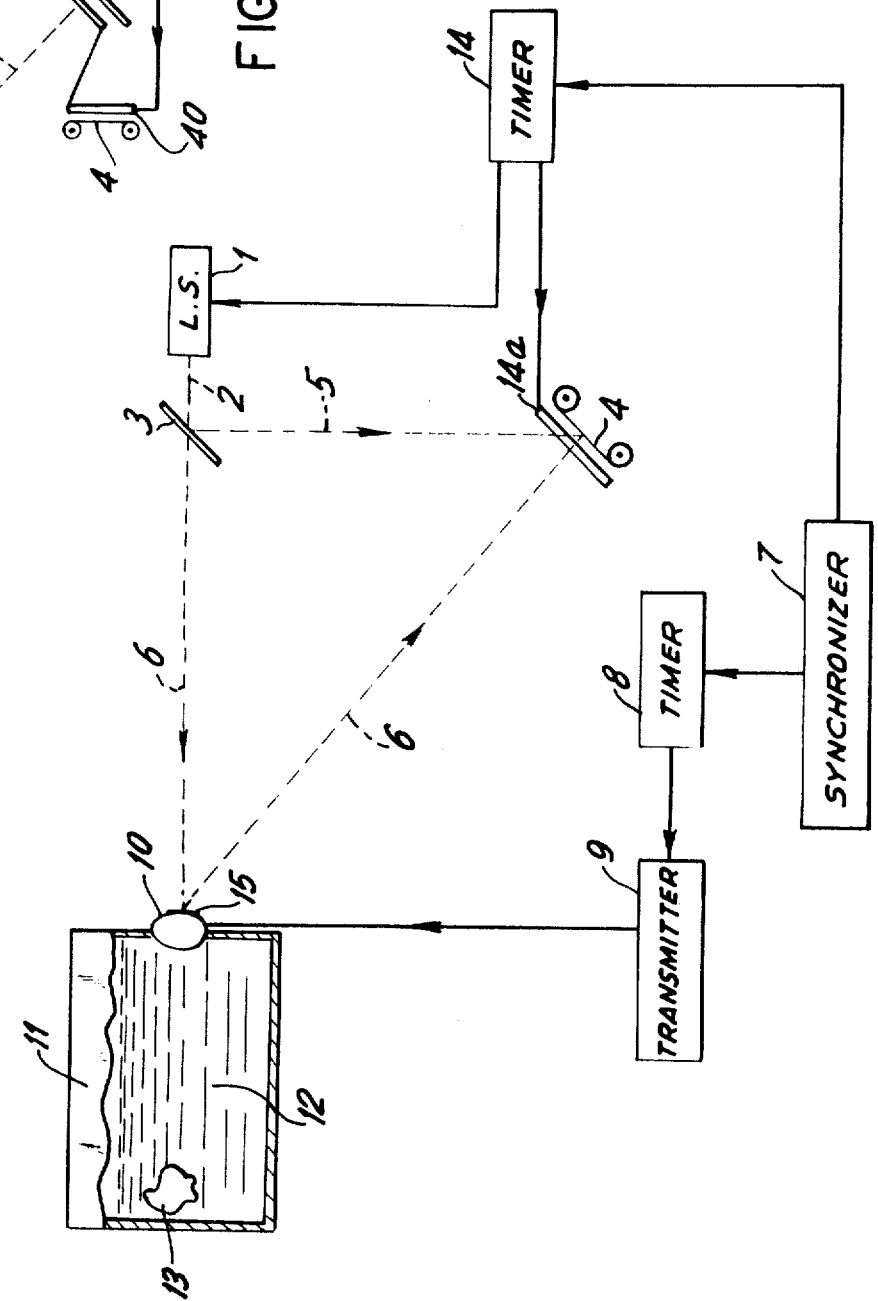
FIG. 1 is a schematic diagram of one embodiment of the present invention.

Referring now to FIGS. 1-4, a light source 1 emits a primary beam 2. The light source 1 may be a laser, or any other source having the ability to transmit a coherent, substantially monochromatic light beam. The primary beam 2 is split by a beam splitter 3, which may be a prism, a beam-splitting mirror, or the like. The beam splitter 3 directs the reference beam 5 portion of the primary beam to a photosensitive surface 4 such as film or a light sensitive crystal. That portion of the primary beam 2 not diverted as a reference beam 5 and hereinafter referred to as the modulateable beam 6 is directed to an ultrasonic element. The modulateable beam 6, as modulated, is directed towards the photosensitive surface 4, meeting the reference beam 5 to form an interference pattern on the photosensitive surface 4.

While a single light source and beam splitting means are shown, it is within the scope of the invention to have two separate light sources of the same frequency and coherence.

As shown in FIG. 1, a synchronizing unit 7 sends a pulse through a timer 8 and transmitter 9, to a transmitting piezoelectric element 10. The piezoelectric element 10 is preferably mounted on the examining tank 11 with the piezoelectric element 10 tuned to emit a desired frequency of ultrasonic pulse through the coupling medium 12 contained in tank 11. The coupling medium 12 is preferably a liquid, such as water which eliminates the need for a high requirement of power and can carry an ultrasonic signal without substantial dissipation of the signal. The object for study, indicated as 13 is in contact with the coupling medium 12. Thus, for example, the examining tank 11 may include a mask worn by a patient, or a suitably coupled acoustically transparent diaphragm, with the object 13 for study being the human eye.

The pulse to the piezoelectric element 10 is cut off and the returning echo, reflected by the object activates the piezoelectric element 10 to vibration.

The light source 1 is activated at the instant the echoes of interest return to the piezoelectric element 10. This activation is timed through the synchronizer 7 and timer 14 to cause light source 1 to emit the primary beam 2 so that the modulateable beam 6 reaches the piezoelectric element 10, as such element 10 reacts to the returning echo. The timer 14 similarly may be employed to present the photosensitive surface 4 to the reference beam with the actuation of the light source 1.

The timer 14 may control the presentation of the photosensitive surface 4 by controlling the shutter 14a. The gating and duration of the light beam to the photosensitive surface 4 may be so controlled by such shutter mechanism 14a, that the zone of resolution recorded on the hologram may be varied as desired.

The piezoelectric element 10 of FIG. 1 includes an optical grating area 15 having a mirrored outer surface which provides a reflecting surface to modulate beam 6, thus, directing the modulated beam 6 to meet the reference beam 5 on the photosensitive surface 4.

When the modulateable beam 6 contacts the piezoelectric element 10, is receiving the returning echo. The modulateable beam 6 is thus modulated by the echo pulse because the amplitude the motion of the surface 15 of the piezoelectric element 10 is proportional in each unit area to the amplitude of the returning echo at that unit area.

Hence, the displacement of the outer surface 15 at each unit area displaces the modulateable beam 6, thus altering its phase and amplitude so that when it recombines with the reference beam 5 on surface 4 it forms an interference pattern which is a hologram of the acoustic field.

When the pulsed ultrasonic wave strikes an object 13, a portion of the incident energy is reflected back at the transmitting source 10 and the remainder of the energy penetrates into the interior of the object 13. An echo is set up at each acoustic discontinuity or interface, as the sound passes through the examined object 13. This process is repeated until the acoustic energy falls below detectable levels. The echo patterns produced by the examined object 13 is characteristic of some of its acoustic properties.

In the interval between transmitted pulses, the return echo may be received by the transducer. When the transducer is a piezoelectric crystal, its receipt of the echo will cause it to vibrate. In the past the received vibration has been used to generate an electrical signal which was then amplified and applied to a cathode ray tube to make the picture. In the present invention, the vibration of the crystal is used to modulate the light beam which is either reflected from the surface of the piezoelectric element or transmitted through it.

The synchronization timers must also be timed so that the light beam to be modulated reaches the crystal at the same instant as the echo of interest causes the crystal to vibrate A different timing might otherwise cause the beam to be modulated by the initial ultrasonic pulse or by echoes having no significant interest to the user.

Rather than pulsating the light beam, the light beam may remain constant with the photosensitive surface 4 shielded by a shutter mechanism 14a, or the like, so that the photosensitive surface 4 is not presented to the intersecting reference beam 5 and modulateable modulated beam 6 unless the shutter is opened to admit the same.

An echo beam reflected to a vibrateable element other than the transducer can be used to modulate the light beam in relation to the echo, and then the modulated beam is directed to the photosensitive surface or recording surface.

In such an instance the timing mechanism 8 might be eliminated since the ultrasonic beam from the transducer need not be pulsed but could be a continuous beam since the echo is not returned to the transducer to interfere with its transmitting of the ultrasonic beam.

In FIG. 1, the element employed, that is, the piezoelectric element 10 has the multiple uses of acting as an emission source for the ultrasonic wave; a reception and translation source for the returning echo; and a reflecting unit for the modulated beam.

After a suitable time delay to allow the echoes of interest to arrive at the piezoelectric element 10, the timer 14 fires the light source 1. As the light leaves the light source 1, it is split into two parts by the beam splitter 3. One path passes directly to the photosensitive surface 4 and the other path is deflected by the beam splitter 3 to the reflective surface of the piezoelectric element 10 where it is ultrasonographically modulated by the distortion of the reflective surface of the piezoelectric element 10. This summation of the reference beam and the ultrasonographically modulated beam 6 results in the formation of the optical hologram. As an alternative method, the light source 1 may be kept on continuously and the camera shutter mechanism 14a may be opened as the piezoelectric element 10 receives the echoes of interest. The formation of the optical hologram would be identical to that described above.

Figure 2:
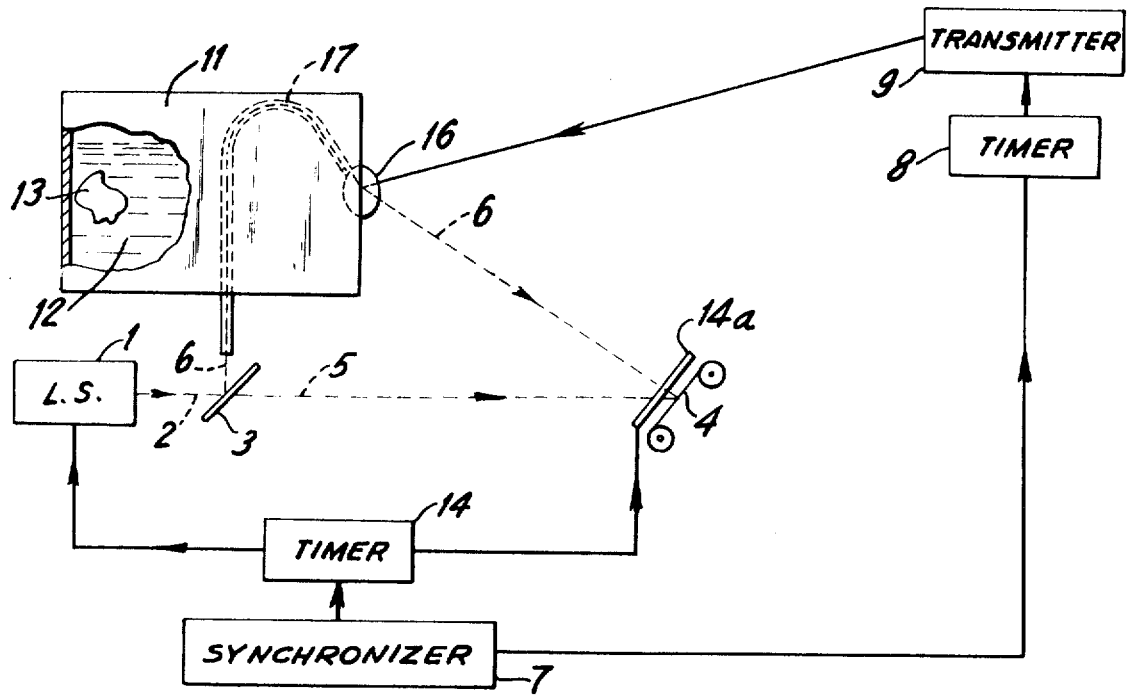
FIG. 2 is another embodiment in diagrammatic form of the present invention.

In FIG. 2, the ultrasonic transmitter, a piezoelectric element 16 allows the passage of light therethrough. The light source 1 such as a laser fires the primary beam 2 to the beam splitter 3, arranged to allow the passage of the reference beam 5 therethrough to the photosensitive surface 4. The modulateable beam 6 is directed, by an optical conduit or fiber optic arrangement 17 or otherwise in a direction that will allow the passage of the modulateable beam 6 through the piezoelectric element 16 and towards the photosensitive surface 4. The physical arrangement of the fiberoptic 17 is such that the same does not interfere with either the transmitted ultrasonic pulse nor the returning echo. In such manner, the light may be introduced below the surface of the water, thus eliminating surface ripples.

The timing arrangement is similar to that discussed with respect to FIG. 1. That is, a synchronizer 7 controls timers 8 and 14. The timer 8 causes the transmitter 9 to emit a pulse through the piezoelectric element 16 to the object 13. The pulse signal is then shut off. Upon the return of the echo to the piezoelectric element 16, the second timer 14 has caused the light source 1 to fire, emitting the substantially monochromatic light beam and causing the photosensitive surface 4 to receive the reference beam 5 and the modulated beam 6.

The acoustic-optical action of the piezoelectric element 16 produces changes in the refractive index of the piezoelectric material, thus changing the phase and amplitude of the elements of light beam 6 transmitted through it, and thus modulating the beam 6. The piezoelectric material of element 16 for this embodiment obviously must be a substantially transparent single crystal. The material is one of the known crystalline types such as quartz. Optical changes in piezoelectric materials such as quartz in response to ultrasonic sound are described, for instance, in "Ultrasonics" by P. Vigoureux, published in 1951 by John Wiley & Sons, at page 56. Also, see "Elastic Propagation in Lithium Niobate" by E. G. Spencer, P. V. Lenzo, and K. Nassau in *Applied Physics Letters*, Vol. 7, No. 3, page 67 published Aug. 1, 1965.

Figure 3:
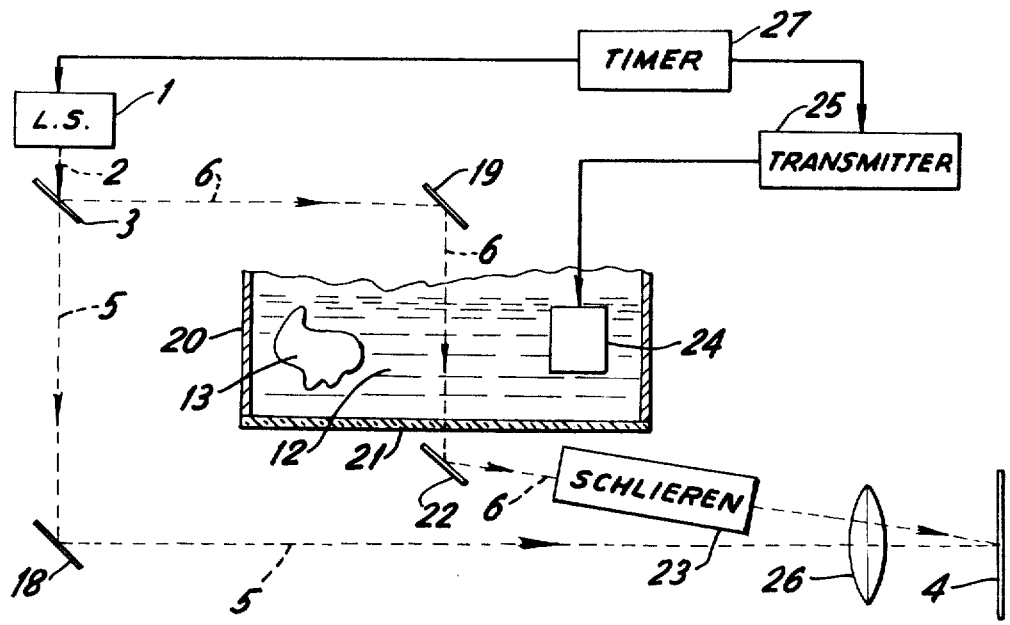
FIG. 3 is another embodiment in diagrammatic form of the present invention.

In FIG. 3, the distorting means for the modulateable beam is the coupling medium itself. As shown therein, the light source 1 emits a primary beam 2 which is split by beam splitter 3. The reference beam 5 is directed, through the use of a reflective surface 18, to the photosensitive surface 4. The modulateable beam 6 is directed by means of a reflector 19 through the coupling medium 12. The examining tank 20 has an optically ground base 21 allowing the passage therethrough of the modulateable beam 6. The modulateable beam 6 is the directed to the photosensitive surface 4. As shown, a further reflective surface 22 may be provided for direction of the modulateable beam 6.

In those instances where the amplitude level of the signal on the modulateable beam 6 is at a low level, the signal may be distinguished from background "noise" by the use of a Schlieren optical system to cancel all light except the first order diffracted light. Thus, as shown in FIG. 3, a Schlieren optic arrangement 23 may be provided for the modulateable beam 6 to detect the optical changes produced by the acoustic displacements and a lens 26 may be provided to reconcile the directional paths of the reference beam 5 and modulateable beam 6 to meet on the photosensitive surface 4. This optical arrangement may be required also to enhance the signals in the embodiments of FIGS. 1 and 2. In these figures, as in FIG. 3, the Schlieren optical arrangement is positioned in the path of the modulateable beam 6 after it leaves the reflective surface of the piezoelectric element 10 and before it reaches the shutter mechanism 14a.

A transducer 24 sends the transmitted signal in the form of an ultrasonic signal through the coupling medium 12 to the object 13 for study. As the echoes return through the coupling medium 12 the timer 27 causes the light source 1 to fire at the correct time. The modulateable beam 6 passes through the coupling medium as the echoes return and is modulated by the same. The interference pattern is then recorded on the photosensitive surface 4.

Figure 4:
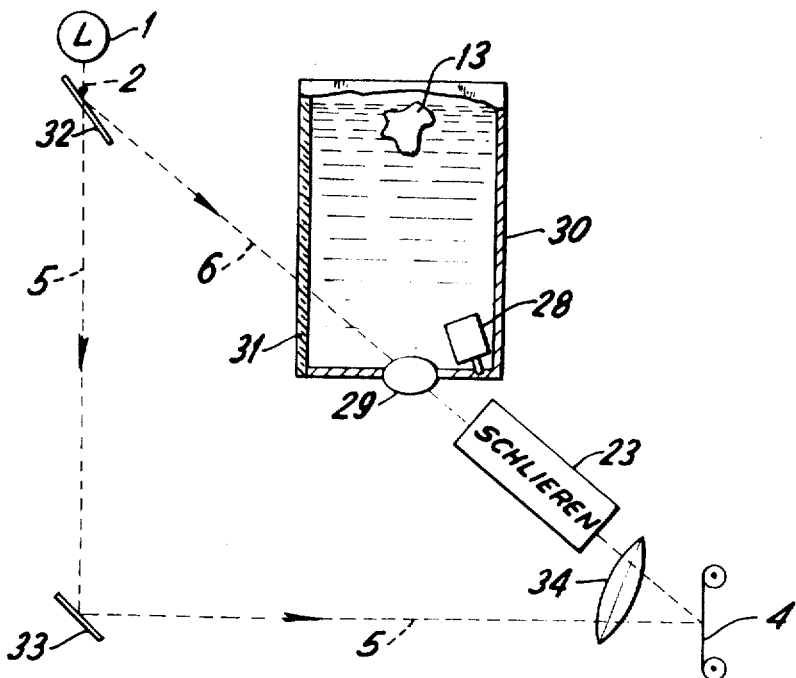
FIG. 4 is a further embodiment in diagrammatic form of the present invention.

In FIG. 4 a separate transmitting transducer 28 and receiving piezoelectric element 29 are employed. The piezoelectric element 29 allows the passage of light therethrough and does not transmit the ultrasonic pulse, but rather acts solely as a recipient and translating medium for the return echoes. The piezoelectric element 29 may be integral to the wall on the examining tank 30, with one wall 31 of the tank 30 optically ground to allow the modulateable beam 6 to pass therethrough, or another type of suitable optical conduit may be used. A beam splitter 32 splits the primary beam 2 emanating from the light source 1 into the reference beam 5 and the modulateable beam 6. A reflector 33 directs the reference beam through a lens 34 to the photosensitive surface 4. Again, Schlieren arrangement 23 may be desirable. The ultrasonic pulse is directed to the object 13 for study by the transducer 28. The returning echoes of interest reach the piezoelectric element 29 as the modulateable beam 6 passes therethrough. The interference pattern between the reference beam 5 and modulateable beam 6, is the recorded on the photosensitive surface 4.

In each of the embodiments of FIGS. 2, 3, and 4, in which the modulateable light is transmitted through the modulation medium, the acoustic-optical reaction of the modulateable medium produces changes in the refractive index of the material, thus changing the phase and the amplitude of light transmitted through it.

It can be appreciated that the various positional relationships of the reflective surfaces, beam splitters and optical arrangements may be modified to suit specific needs. Thus, for example, whole body portions may be examined where they are coupled to an ultrasonic beam which does not have to pass through an energy-absorbing void. Examination of most of the body is contemplated by the device and system of the present invention.

Figure 5:
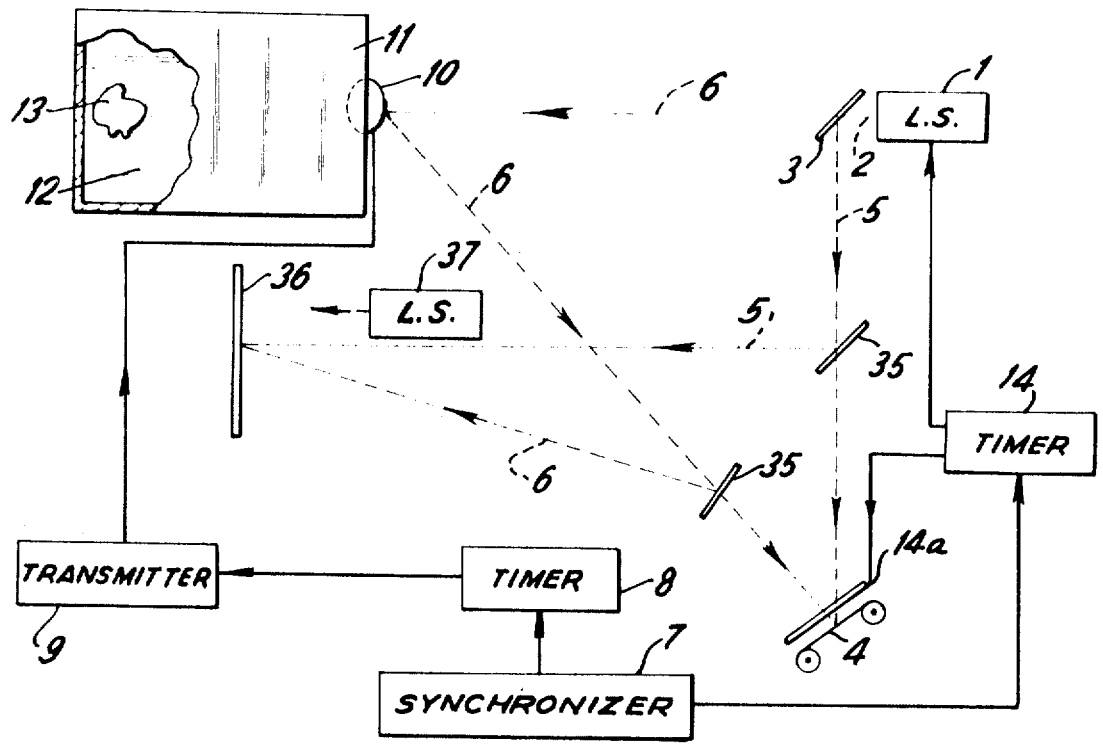
FIG. 5 is a further embodiment in diagrammatic form of the present invention.

As shown in FIG. 5, beam splitters 35 may split the reference beam 5 and modulateable modulated beam 6 so as to direct a portion thereof to a screen 36. It is preferable that the screen 36 be composed of a photochromic or similar substances and it may be necessary to employ two or more screens and an appropriate optical system to visualize this phenomenon. A suitable light source 37 may be employed to "read" the interference pattern of the split reference beam 5 and the split modulateable beam 6 at the point of intersection. Thus, a permanent record can be had on the photosensitive surface 4 and an immediate viewing presentation taken through the translucent screen 36.

Except for the provision of screen 36 and the components associated therewith, the embodiment of FIG. 5 is similar to that of FIG. 1. Again the Schlieren type of optical signal enhancement arrangement may be employed as previously described in connection with FIG. 3. The Schlieren arrangement is positioned in the path of the modulateable beam 6 after it is reflected by the piezoelectric element 10 and before it reaches the reflector 35.

Due to the speed with which the interference patterns are formed, it may be desireable to provide means to retain the pattern for a period of time sufficient to insure its photography. As shown in FIG. 6, the interference pattern may be formed on a screen 38 which may be phosphorescent or photochromic in nature. The interference pattern may then be exposed to the photosensitive surface 4. The timer 39 controlling the shutter 40 for the photosensitive surface would present the photosensitive surface 4 to the screen 38 and may likewise control a shutter mechanism 41 for the screen 38, with the timer 39 tuned with respect to the phosphorescent persistence of the screen 38.

The terms and expressions which are employed are used as terms of description, it is recognized, though that various modifications are possible within the scope of the invention claimed.

I claim:

1. A method of producing a holographic light pattern representative of physical characteristics of an object under observation by deriving said light pattern from an impulse of ultrasonic sound comprising the steps of directing an impulse of ultrasonic sound to the body to be observed, and receiving an echo of the ultrasonic sound impulse from the body to be observed by means of a modulating crystal element subject to physical deflections in response to the sound impulse signals, directing a first beam of coherent light to said modulating crystal element for modulation thereby and directing the beam as modulated by said modulating crystal element to a plane, directing a second beam of coherent light to said plane to intersect said first beam of coherent light at a predetermined angle, said second beam of coherent light having the same frequency and a fixed phase relationship with respect to said first beam of light, the beams intersecting at said plane forming a holographic light pattern, and synchronizing with the impulse of ultrasonic sound the initiation and duration of transmission of said beams of light to said plane to limit the information carried by said light beams to a particular zone of resolution containing echoes of interest.

2. The method as claimed in claim 1 wherein said two beams are provided by the steps of emitting a single beam of substantially coherent light frequency, and passing said single beam through a beam splitter.

3. The method as claimed in claim 1 wherein the modulating element is used as the source of the impulse of ultrasonic sound.

4. The method as claimed in claim 1 wherein the plane where the first beam and second beam intersect comprises a photosensitive surface.

5. The method as claimed in claim 3 wherein the modulating element is a piezoelectric element.

6. The method as claimed in claim 1 wherein a liquid medium acoustically couples the impulse of ultrasonic sound to the object under observation and the object to the modulating element.

7. The method as claimed in claim 1 wherein
the first beam of light is reflected from a surface of said modulating element,
the displacement of individual unit areas of the surface of the crystal being a function of the amplitude of the returning acoustical echo at each such unit area of surface to thereby modulate the beam.

8. A method of producing a holographic light pattern representative of physical characteristics of an object under observation by deriving said light pattern from an impulse of ultrasonic sound comprising the steps of directing an impulse of ultrasonic sound to the body to be observed, and receiving an echo of the ultrasonic sound impulse from the body to be observed by means of a modulating crystal element subject to physical deflections in response to the sound impulse signals, directing a first beam of coherent light to said modulating crystal element for modulation thereby and directing the beam as modulated by said modulating crystal element to a plane, directing a second beam of coherent light to said plane to intersect said first beam of coherent light at a predetermined angle, said second beam of coherent light having the same frequency and a fixed phase relationship with respect to said first beam of light, the beams intersecting at said plane forming a holographic light pattern, the first beam of light being transmitted through the modulating element and the modulation occurring by changes in the refractive index of the separate portions of the modulating element in response to separate portions of the returning ultrasonic sound echo.

9. A method of producing a holographic light pattern representative of physical characteristics of an object under observation by deriving said light pattern from an impulse of ultrasonic sound comprising the steps of directing an impulse of ultrasonic sound to the body to be observed,
and receiving an echo of the ultrasonic sound impulse from the body to be observed by means of a modulating crystal element subject to physical deflections in response to the sound impulse signals,
directing a first beam of coherent light to said modulating crystal element for modulation thereby and directing the beam as modulated by said modulating crystal element to a plane,
directing a second beam of coherent light to said plane to intersect said first beam of coherent light at a predetermined angle,
said second beam of coherent light having the same frequency and a fixed phase relationship with respect to said first beam of light,
the beams intersecting at said plane forming a holographic light pattern,
and passing said first beam as modulated through an optical arrangement including a Schlieren system prior to reaching said plane.

10. The method as claimed in claim 9 further including the step of passing said first beam and said second beam through lens means to reconcile their respective paths prior to said beams intersecting.

11. The method as claimed in claim 4 further including the step of optically gating said photosensitive surface to thereby present said photosensitive surface to said intersecting beams only at predetermined timed intervals.

12. An apparatus for producing an acoustic hologram comprising,
means to transmit an ultrasonic impulse to an object under observation,
a crystal means responsive to ultrasound positioned to receive ultrasonic echoes from the ultrasonic impulses from said transmitting means,
light source means adapted to emit first and second beams of substantially coherent light having the same frequency and a fixed mutual phase relationship and to direct the first of said beams to said means responsive to ultrasound,
said means responsive to ultrasound being operable in response to the ultrasonic echoes to modulate the first light beam,
means for directing the modulated first light beam and said second light beam to intersect at different angles at a common plane to form a hologram,
and means connected to synchronize the actuation of said light source and said transmitting means to present said first beam at said means responsive to ultrasound as said last referred to means reacts to said ultrasound.

13. The apparatus as claimed in claim 12 wherein said light source means includes a light source adapted to emit a substantially coherent light frequency beam and means to split the primary beam emitted by said light source to provide the first and second beams.

14. The apparatus as claimed in claim 12 further including a photosensitive surface at the plane of intersection of the second beam and the modulated first beam.

15. The apparatus as claimed in claim 12 wherein said transmitting means includes a piezoelectric element.

16. The apparatus as claimed in claim 12 further including a liquid coupling medium between the object under observation and said ultrasonic impulse means.

17. The apparatus as claimed in claim 12 wherein said means responsive to ultrasound comprises a piezoelectric element.

18. The apparatus as claimed in claim 12 wherein said transmitting means includes a transducer.

19. The apparatus as claimed in claim 12 wherein said means responsive to ultrasound includes means thereon to reflect said first beam.

20. The apparatus as claimed in claim 12 wherein said light source means includes a laser.

21. The apparatus as claimed in claim 12 wherein said transmitting means and said means responsive to ultrasound are combined in a single piezoelectric element.

22. The apparatus as claimed in claim 12 further including lens means interposed along the paths of said reference beam and said modulateable beam adapted to reconcile the respective paths of said beams to form said interference pattern.

23. The apparatus as claimed in claim 14 further including a timed shutter means interposed between said reference beam and said modulateable beam and said photosensitive surface adapted to prevent the intersection of said reference beam and said modulateable beam on said photosensitive surface.

24. The apparatus as claimed in claim 12 further including a phosphorescent screen at the plane of intersection of said second beam and said modulated first beam and means to photographically record said screen.

25. The apparatus as claimed in claim 12 further including a photochromic screen at the plane of intersection of said second beam and said modulated first beam and means to photographically record said screen.

26. A method of producing a holographic light pattern representative of physical features of a body to be inspected by employing an impulse of ultrasonic sound comprising the steps of directing an impulse of ultrasonic sound through a medium to the body to be observed,
receiving the echo of the impulse of ultrasonic sound from said body by means of an acoustically distortable medium,
directing a first coherent beam of light through said acoustically distortable medium to cause the beam of light to be modulated by the distortions produced by the echo therein,
directing the modulated first beam of light to a predetermined plane,
and directing a second beam of coherent light to said plane at a predetermined angle to the modulated beam of light to thereby form a holographic light pattern representative of the characteristics of the body under observation,
said second beam of light being at the same frequency and having a fixed phase relationship with respect to said first beam of light.

27. Apparatus for producing a holographic light pattern representative of physical features of a body to be inspected by employing an impulse of ultrasonic sound comprising
means for directing an impulse of ultrasonic sound through a medium to the body to be observed,
an acoustically distortable medium positioned to receive the echo of the impulse of ultrasonic sound from said body,
means for directing a first coherent beam of light through said acoustically distortable medium to cause the beam of light to be modulated by the distortions produced by the echo therein,
means for directing the modulated first beam of light to a predetermined plane, and
means for directing a second beam of coherent light to said plane at a predetermined angle to the modulated beam of light to thereby form a holographic light pattern representative of the characteristics of the body under observation,
said second beam of light being at the same frequency and having a fixed phase relationship with respect to said first beam of light.

28. Apparatus as claimed in claim 27 wherein the acoustically distortable medium is a crystal.

29. Apparatus as claimed in claim 28 wherein the crystal is a piezoelectric element.

30. Apparatus as claimed in claim 27 wherein the acoustically distortable medium is a liquid.

31. Apparatus as claimed in claim 30 wherein the liquid acoustically distortable medium is water.

32. Apparatus as claimed in claim 19 wherein said reflecting means comprises an optical grating.

33. The apparatus as claimed in claim 27 wherein said means for directing the first beam of light through said acoustically distortable medium includes a fiber optic device.

PO-1050
(5/69)

UNITED STATES PATENT OFFICE
CERTIFICATE OF CORRECTION

Patent No. 3,600,935          Dated August 24, 1971

Inventor(s) GILBERT BAUM

It is certified that error appears in the above-identified patent and that said Letters Patent are hereby corrected as shown below:

Column 3, line 5, after "10," insert --the piezoelectric element 10--.
        line 7, after "plitude" insert --of--.

line 35, after "vibrate" insert a period (.).
Column 4, line 46, cancel "the" (second occurrence) and insert --then--.
Column 5, line 19, cancel "the" (first occurrence) and insert --then--.

Signed and sealed this 15th day of February 1972.

(SEAL)
Attest:

EDWARD M. FLETCHER, JR.
Attesting Officer

ROBERT GOTTSCHALK
Commissioner of Patents